United States Patent [19]
Deeds et al.

[11] Patent Number: 4,896,135
[45] Date of Patent: Jan. 23, 1990

[54] ELECTRONIC RANGE INDICATOR FOR A MOTOR VEHICLE

[75] Inventors: Lisa D. Deeds; Dennis M. Lombardo, both of Haslett, Mich.

[73] Assignee: General Motors Corporation, Detroit, Mich.

[21] Appl. No.: 303,380

[22] Filed: Jan. 30, 1989

[51] Int. Cl.$^4$ .......................... B60Q 1/00; H01H 3/16
[52] U.S. Cl. .................... 340/456; 340/461; 200/61.88; 200/61.91; 74/473 R
[58] Field of Search ................. 340/456, 461; 314/79; 74/640, 473 R; 200/61.85, 61.91, 61.88

[56] References Cited
U.S. PATENT DOCUMENTS

| | | | |
|---|---|---|---|
| 4,037,196 | 7/1977 | Atkinson et al. | 340/456 |
| 4,100,530 | 7/1978 | den Brinker et al. | 340/456 |
| 4,199,747 | 4/1980 | Miller et al. | 340/456 |
| 4,498,359 | 2/1985 | Hara | 200/61.88 |

Primary Examiner—Donnie L. Crosland
Attorney, Agent, or Firm—Mark A. Navarre

[57] ABSTRACT

An electronic range indicator apparatus in which a switch array powered by the vehicle ignition voltage is used to indicate the selected transmission range during both on and off periods of the vehicle. During on periods of the vehicle, the ignition voltage is transmitted through the closed contacts (if any) of the switch array, and a decoder/driver module decodes the output of the switch array and lights the indicator indicia corresponding to the selected range. During off periods of the vehicle, the ignition feed to the switch array is open circuited. In such case, the decoder/driver module effectively grounds the ignition feed of the switch array, and lights the appropriate indicator indicia using an inverse logic decode scheme.

5 Claims, 2 Drawing Sheets

|   | P | IN BETWEEN | R | IN BETWEEN | N | D | 2 | 1 |
|---|---|---|---|---|---|---|---|---|
| D | 0 | 0 | 1 | 1 | 1 | 0 | 0 | 0 | 0 | 0 |
| A | 1 | 1 | 1 | 1 | 0 | 1 | 0 | 0 | 0 | 1 |
| B | 1 | 1 | 1 | 1 | 1 | 1 | 1 | 0 | 0 | 0 |
| C | 1 | 0 | 1 | 0 | 0 | 0 | 0 | 0 | 1 | 1 |

ELECTRONIC RANGE INDICATOR FOR A MOTOR VEHICLE

This invention relates to an electronic apparatus for indicating the selected range of a motor vehicle transmission, and more particularly to an indicator which operates during both on and off periods of the vehicle.

BACKGROUND OF THE INVENTION

The selected range of a motor vehicle transmission is typically performed with a pointer which is mechanically driven by an operator manipulated transmission range selector. Electronic indicators have also been used, as for example, on the 1985 Buick, Oldsmobile and Cadillac vehicles; in such vehicles, a switch array powered by battery or ignition voltage is employed to detect the position of the range selector.

SUMMARY OF THE PRESENT INVENTION

The present invention is directed to an electronic range indicator apparatus in which a switch array powered by the vehicle ignition voltage is used to indicate the selected transmission range during both on and off periods of the vehicle. During on periods of the vehicle, the ignition voltage is transmitted through the closed contacts (if any) of the switch array and a decoder/driver module decodes the output of the switch array and activates the indicator indicia corresponding to the selected range. During off periods of the vehicle, the ignition feed to the switch array is open circuited. In such case, the decoder/driver module effectively grounds the ignition feed of the switch array and activates the appropriate indicator indicia using an inverse logic decode scheme.

DETAILED DESCRIPTION OF THE DRAWINGS

Figure 1:
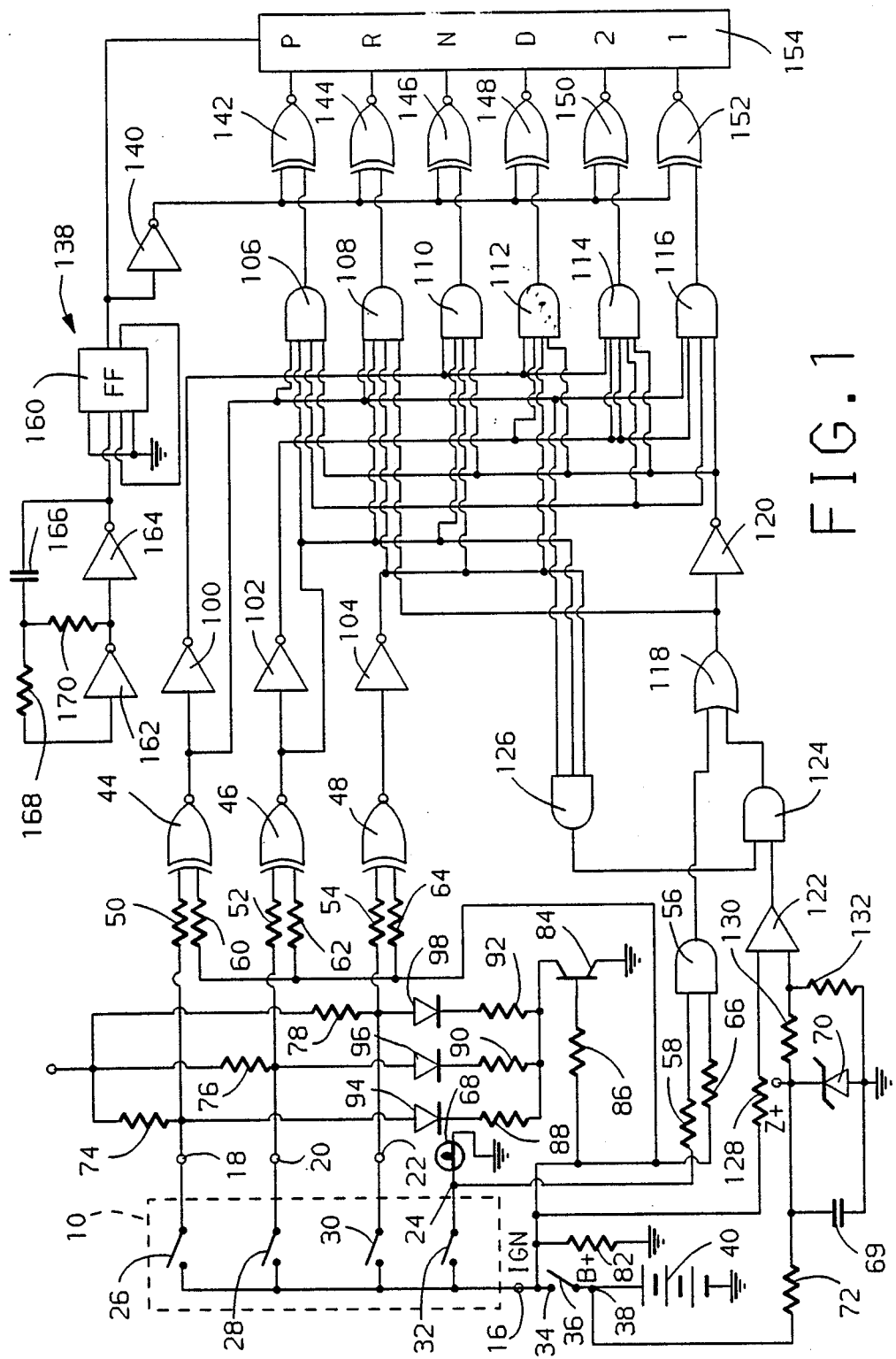
FIG. 1 is a circuit diagram of the indicator apparatus of this invention.
Figures 2, 3:
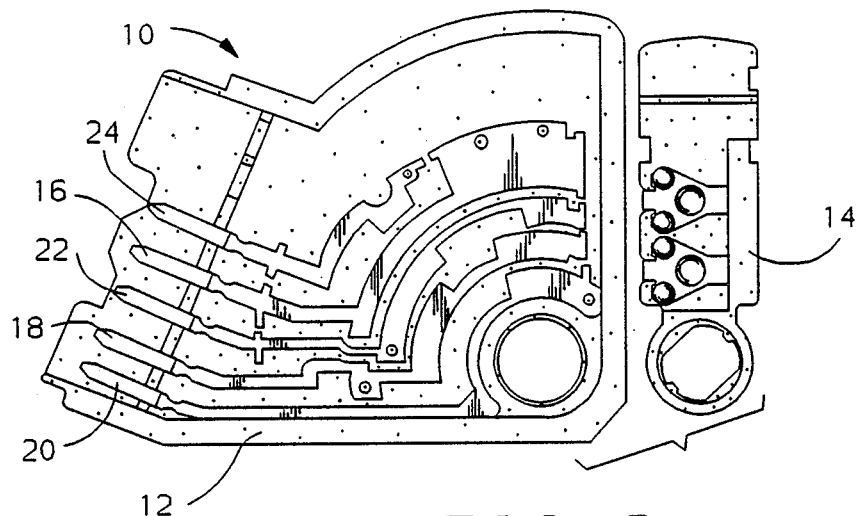
FIG. 2 is a diagram of a switch array used in connection with the indicator apparatus of FIG. 1.
FIG. 3 is a truth table of the switch array of FIG. 2.

Referring to FIGS. 1 and 2, the reference numeral 10 generally designates an electronic switch array for detecting the park (P), reverse (R), neutral (N), drive (D), second (2) and first (1) ranges of a three-speed motor vehicle automatic transmission, not shown. The switch array is preferably mounted on the case of the transmission; the contact member 12 is stationary within the switch housing, not shown, and the contact member 14 is rotatably driven by the transmission range selector, also not shown.

Vehicle ignition voltage (IGN) is supplied to terminal 16 of contact member 12 and the logical outputs A, B, C and D are generated at terminals 18, 20, 22 and 24, respectively. In practice, the switch array 10 is also used as a back-up lamp switch and to inhibit operation of the engine cranking motor when the range selector is in a position other than Park or Neutral The metallic patterns on the contact members 12 and 14 are brought into successive engagement with operator manipulation of the range selector to define a predefined relationship between the range selector position and the logical outputs A, B, C and D. A truth table setting forth the predefined relationship is depicted in FIG. 3, a "1" indicating a closed switch and a "0" indicating an open switch. Referring specifically to FIG. 3, the P position of the range selector is designated by an ABCD logical output state of 1110. Similarly, the R position is designated by an ABCD logical output state of 1101, the N position is designated by an ABCD logical output state of 0100, the D position is designated by an ABCD logical output state of 0000, the 2 position is designated by an ABCD logical output state of 0010 and the 1 position is designated by an ABCD logical output state of 1010. Any output logic combination which is generated between the P, R, N, D, 2 and 1 detent positions of the range selector results in a state other than those set forth above; such states are undefined and no range indication is commanded.

The switch 10 is schematically depicted in FIG. 1 as an array of four normally open switches 26, 28, 30 and 32, each having one terminal connected to the switched terminal 34 of a conventional ignition switch 36. The unswitched terminal 38 of ignition switch 36 is connected directly to the positive terminal of the vehicle storage battery 40, the negative battery terminal being connected to the vehicle ground. The positive battery voltage at ignition switch terminal 38 is designated in FIG. 1 as B+ and the ignition voltage at ignition switch terminal 34 is designated as IGN.

The switch array outputs A, B and C are connected as inputs to the Exclusive-NOR gates 44, 46 and 48 via resistors 50, 52 and 54, respectively. The output D is connected as an input to AND-gate 56 via resistor 58. The ignition voltage IGN is supplied via resistors 60, 62, 64 and 66 to the other input of each such gate. The D output is also connected to the vehicle backup lamp circuit, as indicated by the lamp 68.

The operating voltage for these and other electronic devices depicted in FIG. 1 is generated by a battery-fed voltage regulator comprising the capacitor 69, the Zener diode 70 and a current limiting resistor 72. Such voltage is designated as Z+ and is somewhat less than the battery voltage B+.

When the ignition switch 36 is open, the switch outputs A, B and C are held at a normally high potential (such as 10 volts) by the pull-up resistors 74, 76 and 78, respectively. Closure of any switch 26, 28 or 30 causes the corresponding output A, B or C to assume a relatively low voltage potential (such as 1 volt) determined by the divider ratio of the respective pull-up resistor 74, 76 or 78 and an ignition-grounding resistor 82. In the mechanization of FIG. 1, the resistances of the pull-up resistors 74, 76 and 78 were chosen to be approximately thirty times that of the ignition-grounding resistor 82, thereby providing a minimum voltage divider ratio of about 10:1 with switches 26, 28 and 30 all closed.

With the ignition switch 36 open, the arrangement described above produces a logic zero voltage potential at the output of gates 44, 46 or 48 when the respective switches 26, 28 or 30 are open. A logic one voltage potential is produced at the output of gates 44, 46 or 48 when the respective switches 26, 28 or 30 are closed. So long as the ignition switch 36 is open, the output of AND-gate 56 assumes a logic zero voltage potential regardless of the state of switch 32.

When the ignition switch 36 is closed, the ignition voltage IGN biases the transistor 84 conductive via the resistor 86 and the switch outputs A, B and C are held at a normally low potential (such as 1 volt) by the pull-down resistors 88, 90 and 92, respectively. The diodes 94, 96 and 98 provide isolation between the switch outputs A, B and C. Closure of any switch 26, 28 or 30 connects ignition voltage IGN to the corresponding output A, B or C. The ignition voltage IGN is also applied to the inputs of gates 44, 46, 48 and 56. Under such conditions, an open switch 26, 28, 30 or 32 produces a logic zero voltage potential at the output of gates 44, 46, 48 or 56 and closure of the switches 26, 28, 30 or 32 produces a logic one potential at the output of gates 44, 46, 48 or 56.

Significantly, the same output condition occurs at the exclusive-NOR-gates 44, 46 and 48 whether the ignition switch 36 is open or closed. In other words, the A, B and C truth table relationships depicted in FIG. 3 are preserved at the outputs of gates 44, 46 and 48. It is this logic reversing function which permits the range selector position to be properly decoded and indicated continuously, whether the vehicle is in operation or not.

The D output condition of switch array 10 and its inverse are generated at the outputs of OR-gate 118 and inverter 120, respectively. When the ignition switch 36 is closed, the OR-gate 118 and inverter 120 are controlled by AND-gate 56—that is, the output of OR-gate 118 is high when the switch 32 is closed and low when the switch 32 is open. When the ignition switch 36 is open (as detected by comparator 122), the OR-gate 118 and inverter 120 are controlled by AND-gates 124 and 126. The comparator 122 senses the ignition voltage IGN via resistor 128, the Z+voltage via resistors 130 and 132 and has a high output when the ignition switch 36 is open. The AND-gate 126 detects the reverse (R) logical combination of ABC =110. As a result, the output of OR-gate 118 follows that of AND-gate 126 whenever the ignition switch 36 is open.

In decoding the P, R, N, D, 2 and 1 range selector positions, the appropriate output combinations of the gates 44, 46, 48 and 118 and their inverses (provided by the inverters 100, 102, 104 and 120) are supplied as inputs to the decoder AND-gates 106, 108, 110, 112, 114 and 116. Such AND-gates are simply the logic-gate equivalent of the truth table of FIG. 3. Thus, the park (P) condition is decoded by AND-gate 106 which assumes a logical one output when A, B and C are high and D is low, the reverse (R) condition is decoded by AND-gate 108 which assumes a logical one output when A, B and D are high and C is low and so on. Any ABCD combinations other than the ones decoded by the AND-gates 106-116 and not recognized and do not produce a decoder output.

The outputs of the decoder AND-gates 106-116 are modulated by an oscillator circuit 138 via inverter 140 and the exclusive-NOR-gates 142-152. The oscillator circuit 138 is defined by a D-type flip-flop 160 driven by the RC relaxation oscillator elements 162-170. The NOR-gate outputs are applied as inputs to a liquid crystal range selector indicator 154 and the backplane of the display 154 is energized directly by the oscillator output. In this way, any logical one output of the decoder AND-gates 106-116 produces a potential difference across the corresponding display indicia to activate the same, thereby indicating the selected range of the transmission.

While this invention has been described in relation to the illustrated embodiment, it is expected that various modifications thereto will occur to those skilled in the art. Devices incorporating such modifications may fall within the scope of this invention, which is defined by the appended claims.

The embodiments of the invention in which an exclusive property or privilege is claimed are defined as follows:

1. In a motor vehicle having a selector mechanism adapted to be positioned by a vehicle operator for selecting a desired transmission range, and position detecting means including at least one limit switch having input and output terminals which are electrically connected or disconnected depending on the position of said selector mechanism, apparatus for providing a continuous electronic indication of the selector mechanism position, comprising:

on state means operative during on periods of the vehicle to connect said input terminal to a relatively high potential system voltage, while biasing said output terminal toward a lower voltage which is overridden by said high potential system voltage when said input and output terminals are connected;

off state means operative during off periods of the vehicle to connect said input terminal to said lower voltage, while biasing said output terminal toward a higher voltage which is overridden by said lower voltage when said input and output terminals are connected, thereby to logically invert the output terminal voltage as compared with that established during on periods of the vehicle; and decoding means for driving an electronic display (1) in accordance with the voltage at the output terminal of said limit switch during on periods of the vehicle, and (2) in accordance with the logical inverse of the voltage at the output terminal of said limit switch during off periods of the vehicle, thereby to provide an indication of the selector mechanism position during both on and off periods of the vehicle without requiring the supply of said high potential system voltage to the input terminal of said limit switch during the off periods of said vehicle.

2. The apparatus set forth in claim 1, wherein the vehicle includes a storage battery having positive and negative terminals, and the on state means comprises:

an ignition switch connecting the positive terminal of said storage battery to the input terminal of said limit switch; and resistor means connecting the negative terminal of said storage battery to the output terminal of said limit switch.

3. The apparatus setforth in claim 1, wherein the vehicle includes a storage battery having positive and negative terminals, and the off state means comprises:

first resistor means connecting the negative terminal of said storage battery to the input terminal of said limit switch; and second resistor means connecting the positive terminal of said storage battery to the output terminal of said limit switch.

4. The apparatus set forth in claim 1, wherein the decoding means includes an exclusive-OR device having a first input connected to the higher potential system voltage and a second input connected to the output terminal of said limit switch.

5. In a motor vehicle having a selector mechanism adapted to be positioned by a vehicle operator for selecting a desired transmission range, and position detecting means including at least one limit switch having input and output terminals which are electrically connected or disconnected depending on the position of said selector mechanism, apparatus for providing a continuous electronic indication of the selector mechanism position, comprising:

- a storage battery having positive and negative terminals;
- off state means including a relatively low resistance connection between the input terminal of said limit switch and the negative terminal of said storage battery, and a relatively high resistance connection between the output terminal of said limit switch and the positive terminal of said storage battery;
- on state means operative during on periods of the vehicle including an ignition switch connecting the input terminal of said limit switch to the positive terminal of said storage battery, and a relatively low resistance connection between the output terminal of said limit switch and the negative terminal of said storage battery, thereby to override the relatively low and high resistance connections of said off state means; and
- decoding means for driving an electronic display (1) in accordance with the voltage at the output terminal of said limit switch during on periods of the vehicle, and (2) in accordance with the logical inverse of the voltage at the output terminal of said limit switch during off periods of the vehicle, thereby to provide an indication of the selector mechanism position during both on and off periods of the vehicle without connecting the positive terminal of said storage battery to the input terminal of said limit switch during off periods of said vehicle.

* * * * *